United States Patent [19]

Kawabata

[11] Patent Number: 5,099,364
[45] Date of Patent: Mar. 24, 1992

[54] VIDEO RECORDER WITH REDUCED POWER CONSUMPTION

[75] Inventor: Masaru Kawabata, Nagaokakyo, Japan

[73] Assignee: Mitsubishi Denki Kabushiki Kaisha, Tokyo, Japan

[21] Appl. No.: 449,152

[22] Filed: Dec. 15, 1989

Related U.S. Application Data

[63] Continuation of Ser. No. 933,384, Nov. 21, 1986, abandoned.

[30] Foreign Application Priority Data

Nov. 25, 1985 [JP] Japan .................................. 60-266565
May 19, 1986 [JP] Japan .................................. 61-115615

[51] Int. Cl.$^5$ .......................................... H04N 5/782
[52] U.S. Cl. ................................. 360/33.1; 358/335; 358/906
[58] Field of Search ............... 360/33.1, 35.1, 36.1, 360/36.2, 70; 358/335, 906, 338-339

[56] References Cited

U.S. PATENT DOCUMENTS

| | | | |
|---|---|---|---|
| 4,057,830 | 11/1977 | Adcock | 358/906 X |
| 4,386,376 | 5/1983 | Takimoto et al. | 358/906 X |
| 4,440,743 | 8/1983 | Takimoto et al. | 358/906 X |
| 4,507,690 | 3/1985 | Azuma et al. | 358/906 X |
| 4,544,959 | 10/1985 | Kozuki et al. | 358/906 X |
| 4,675,747 | 6/1987 | Hanma et al. | 358/906 X |

OTHER PUBLICATIONS

Product Specification, *Video-Integrated Camera NV-M1*, Technical Guide No. 39, Matsushita Denki Sangyo Kabushiki Kaisha, Japan, Mar., 1985.
"Kodavision User's Guide", Eastman Kodak Company, pp. 2-3, pp. 12-15, pp. 38-41.
"Video Camera Recorder CCD-M8", Sony Corp., pp. 14-16.
Seiji SATO et al., "Recording Video Camera in the Beta Format", IEEE Intl. Conference on Consumer Electronics, pp. 1-11, Jun. 9, 1983.

*Primary Examiner*—Roy N. Envall, Jr.
*Assistant Examiner*—W. R. Young
*Attorney, Agent, or Firm*—Sterne, Kessler, Goldstein & Fox

[57] ABSTRACT

A video recording apparatus comprises image pickup device section for forming an image of a subject and outputting an electrical signal corresponding to the image, a magnetic recorder for recording the electrical signal outputted from the image pickup means along tracks inclined with respect to the direction of the length of a magnetic tape, a start switch manipulated to start recording by the recorder, a power supply circuit, and means responsive to the manipulation of the start switch for causing power to be supplied from the power supply circuit to the image pickup means and the recorder.

20 Claims, 8 Drawing Sheets

VIDEO RECORDER WITH REDUCED POWER CONSUMPTION

This application is a continuation of application Ser. No. 06/933,384, filed 11/21/86, now abandoned.

BACKGROUND OF THE INVENTION

The present invention relates to a video recording apparatus, particularly a portable video recording apparatus, which picks up an image of a subject, generates an electrical signal corresponding to the image of the subject, and records the electrical signal on a magnetic tape.

A typical example of such a video recording apparatus is an integrated or all-in one camera/VTR.

FIG. 8 shows an example of a conventional all-in-one camera/VTR. As illustrated, it comprises a system control section 1, a power supply section 2 for supplying electric power to various circuits, an image pickup section 3 for picking up the image of a subject and generating an electrical video signal corresponding to the subject thus picked up, and a magnetic recording-/reproducing section (hereinafter referred to as VTR section) 4 of a rotary head type which records the video signal outputted from the image pickup section 3 on a magnetic tape, and reproducing the recorded video signal.

The image pickup section 3 comprises an image pickup device 5, an electrical signal processing circuit 6 and a synchronous signal generating circuit 7. To pick up a subject, an image of the subject is formed on a charge storage section of an image pickup element, such as a CCD (charge coupled device) in the image pickup device 5 by means of lenses. The image of the subject formed in the charge storage section is scanned by a signal from the synchronous signal generating circuit 7 and read out to be an electrical signal continuous in time. The electrical signal is then converted at the electrical signal processing circuit 6 into an ordinary television signal and this television signal is then outputted from the image pickup section 3.

The VTR section 4 comprises a video signal recording circuit 8, a video signal reproducing circuit 9, a drum rotation control circuit 12, and a tape travel control circuit 13. The television signal outputted from the image pickup section 3 is converted at the video signal recording circuit 8 into an FM (frequency-modulaled) signal, and then supplied through a recording/reproducing switch 10 and a rotary transformer, not shown, to a rotary magnetic head 11, and is then recorded by the rotary magnetic head 11 on the magnetic tape.

The drum rotation control circuit 12 comprises a phase comparator 21, a phase compensation circuit 14, a speed control circuit 15, a motor drive circuit 16, a drum motor 18, a drum rotary position detecting device 17 for detecting the rotary position of the rotary drum, and a speed detecting device 19 for detecting the rotational speed of the drum motor 18. The control of the rotation of the rotary drum is conducted in the following manner.

The rotary position detection signal, i.e., the so-called PG signal from the drum rotary position detecting device 17 is phase-compared at the phase comparator 21, either with a vertical synchronous signal outputted from the image pickup section 3 when a video signal is recorded on a magnetic tape, or with a reference signal from an internal reference signal generating circuit 22 when recording of a video signal on a magnetic tape is not made. The phase error signal outputted from the phase comparator 21 is supplied to the phase compensation circuit 14 which performs phase compensation. The speed detection signal from the speed detecting device 19 is supplied to the speed control circuit 15, which produces a speed error signal, which is added to the output of the phase compensation circuit 14, and the sum signal is inputted to the motor drive circuit 16. The motor drive circuit 16 thereby drives the drum motor 18 to control the rotary phase of the rotary drum.

The system control section 1 performs control over the entire system, and is connected to receive signals or information from a start/stop switch 40, a standby switch 41, various other switches, collectively indicated by reference numeral 44, and various sensors 42, and produces various power supply control signals and various system control signals, to bring the system into a certain operating state and to cause various display devices 43 to perform display or indication.

The power supply section 2 supplies electric power to various circuits in accordance with the various power control signals from the system control section 1.

An electronic viewfinder 45 has a built-in CRT on which a reproduced signal from the video signal reproducing circuit 9 is displayed during the signal reproduction, while the television signal from the electrical signal processing circuit 6 is displayed in any other operating state.

Now, transitions between the various system operating states according to the conventional system will be described with reference to FIG. 9.

In FIG. 9, EJECT represents the state in which a cassette is inserted or taken out. STOP represents the state of waiting or standby. F·F represents the state of fast forward travel of the tape. REW represents the state of rewinding or reverse fast travel of the tape. P·B represents the state of reproduction of the signal recorded on the tape F·S and R·S respectively represent the state of speed search with forward and reverse travel. REC represents the state of recording the subject picked up on the tape. REC PAUSE represents the state of waiting or pause before transfer to the REC state. POWER represents the state of "power off".

In this conventional system, the so-called loading standby system is adopted, by which upon insertion of a cassette, the tape is loaded and wound around the rotary drum, and, with such conditions, the system becomes in the state "STOP" of standby. In the STOP state, no power is supplied to all the circuit blocks except the system control section 1. To pick up the subject, a specific key is pressed, so that the operating state of the system is transferred into REC PAUSE, a state of pause ready for recording. In this state, electric power is supplied at least to the system control section 1, the image pickup section 3, the electronic viewfinder 45, and the drum rotation control circuit 12 within the recording/reproducing section 4 required for rotating the rotary drum. If the start/stop switch 40 is pressed in the state of REC PAUSE, supply of electric power to the circuit block required for recording the signal is commenced, and the tape travel is commenced and the signal picked up by the pickup section 5 is recorded on the tape (REC state). If the start/stop switch 40 is pressed in this REC state, the system is transferred again to the REC PAUSE. To begin reproduction from the STOP state, a manual key for the reproduction may be manipulated, upon which an electric power is supplied to the system control section 1, electronic viewfinder 45 and the circuit blocks within the recording/reproducing section 4 required for the signal reproduction (PB state).

FIG. 10 shows transition between operating states in another conventional system. This system is intended to simplify the manipulation, and the state of REC PAUSE and the state of STOP in FIG. 9 have been made one and the same. In this example, the STOP state is always a state of pause ready for recording. The recording of the picked-up image can be started and terminated simply by manipulating the start/stop switch 40.

The reason why the state of pause ready for recording is necessary in conventional all-in-one camera/VTRs, i. e, why the conventional all-in-one camera/VTR must assume the state of pause ready for recording before entering the state of recording is given below. With an all-in-one camera/VTR as well as other video/audio recording apparatus, it is desired that the recording should begin immediately when a manipulation switch is manipulated. This is mainly because of the psycological demand of the operator. Such a requirement is particularly severe with an all-in-one camera/VTR. The time from the manipulation of the start/stop switch until the commencement of the actual recording in commercially available all-in-one camera/VTR is usually about one to two seconds, and such time delay is considered to be acceptable.

The manipulation and the operation of the VTR at the time of "shooting" will be described.

To shoot, the lens is directed to the subject to be shot, and the image of the subject is confirmed by means of a viewfinder, and the focus is adjusted manually or automatically. After these preparatory operations, a manipulation key such as the start/stop switch 40 is manipulated to provide the all-in-one camera/VTR with the information that the recording should be started. Upon the delivery of such information, the travel of the magnetic tape is started. When the travel of the tape is started the signal already recorded on the tape is reproduced, and the travel of the tape is so controlled that the scanning locus followed by the magnetic head mounted on the rotary drum conform to the locus of the track of the signal already recorded on the tape. This is to ensure continuity with the previous recording. When the scanning locus of the magnetic head is brought into conformity with the track already recorded, actual recording on the tape is started.

As has been described, the conventional system of FIG. 8 requires various manipulations and operation for implementing the recording. The state of pause ready for recording, i. e., REC PAUSE state of FIG. 9 or STOP (REC PAUSE) state of FIG. 10, is provided so that during this state, electric power is supplied to the image pickup section 3, the electronic viewfinder 45 and the drum rotation control circuit 12, to enable confirmation of the image of the subject inputted through the lens on the screen of the electronic viewfinder 45, and to cause rotation of the rotary drum in such a manner that the rotational phase of the rotary drum is in phase with the sweeping (scanning) of the charge storage section in the image pickup section 5 for storing the image of the subject. Accordingly, if, in the state of pause ready for recording, the start/stop switch 40 is manipulated, the time (about 1 to 2 seconds) necessary for bringing the locus of the head into conformity with the locus of the previous track is taken before the recording is actually started.

The conventional all-in-one camera/VTRs are usually portable and a battery is used as a power supply when the all-in-one camera/VTR is used outdoors. The power consumption of these all-in-one camera/VTRs during shooting is about 6 to 10W, and it is usually so set that the shooting time of about 1 hour is guaranteed, taking account of the suitable size and weight of the battery.

When the system is in the state of pause ready for recording, as at REC PAUSE in FIG. 9 or STOP (REC PAUSE) in FIG. 10, it is necessary that the electric power be supplied to most of the circuits, and the power consumption during such a state is 80% with respect to the power consumption during shooting and recording. If the state of pause ready for recording is continued for a long time, the consumption of the battery is large. This will shorten the time of actual recording.

Various arrangements are employed to reduce the power consumption when the actual recording is not made. As an example, when the pause state continues 3 to 5 minutes, the system is automatically transferred to a standby state in which electric power is supplied only to those circuits within the system control section 1 required to recognize the operating state. In such a standby state, the power consumption is not more than about 1W. When the standby switch 41 is manipulated during the standby state, the system is returned to the pause state. The same standby switch 41 can also be used for transfer of the system to the standby state.

As was described, the power consumption of the conventional all-in-one camera/VTR during the recording pause state is large. Even if a standby switch is provided, the consumption of the battery during actual use is large. Moreover, the provision of the standby switch makes the manipulation complicated.

Furthermore, when the recording is to be resumed by terminating the standby state, the drum has been at a stop, and has been out of synchronism with the video signal (synchronous signal) from the image pickup section 3, and the drum has a large inertia and hence is difficult to follow the speed control. Accordingly, the drum is not brought into phase with the video signal and no recording of the signal is made until elapse of about 4 to 5 seconds after the standby state is terminated.

SUMMARY OF THE INVENTION

An object of the invention is to solve the above-described problems.

Another object of the invention is to provide a video recording apparatus with which, when the standby state is terminated, the recording of the signal can be started with a time delay (of about 1 second) which is not problematical in practical use.

A further object of the invention is to reduce the power consumption.

A further object of the invention is to eliminate the necessity to provide the standby switch and hence to facilitate the manipulation.

According to the invention, there is provided a video recording apparatus comprising image pickup means for forming an image of a subject and outputting an electrical signal corresponding to the image, a magnetic recorder for recording the electrical signal outputted from the image pickup means along tracks inclined with respect to the direction of the length of a magnetic tape, a start switch manipulated to start recording by the recorder, a power supply circuit, and means responsive to the manipulation of the start switch for causing power to be supplied from the power supply circuit to the image pickup means and the recorder.

DETAILED DESCRIPTION OF THE PREFERRED EMBODIMENTS

Figure 1:
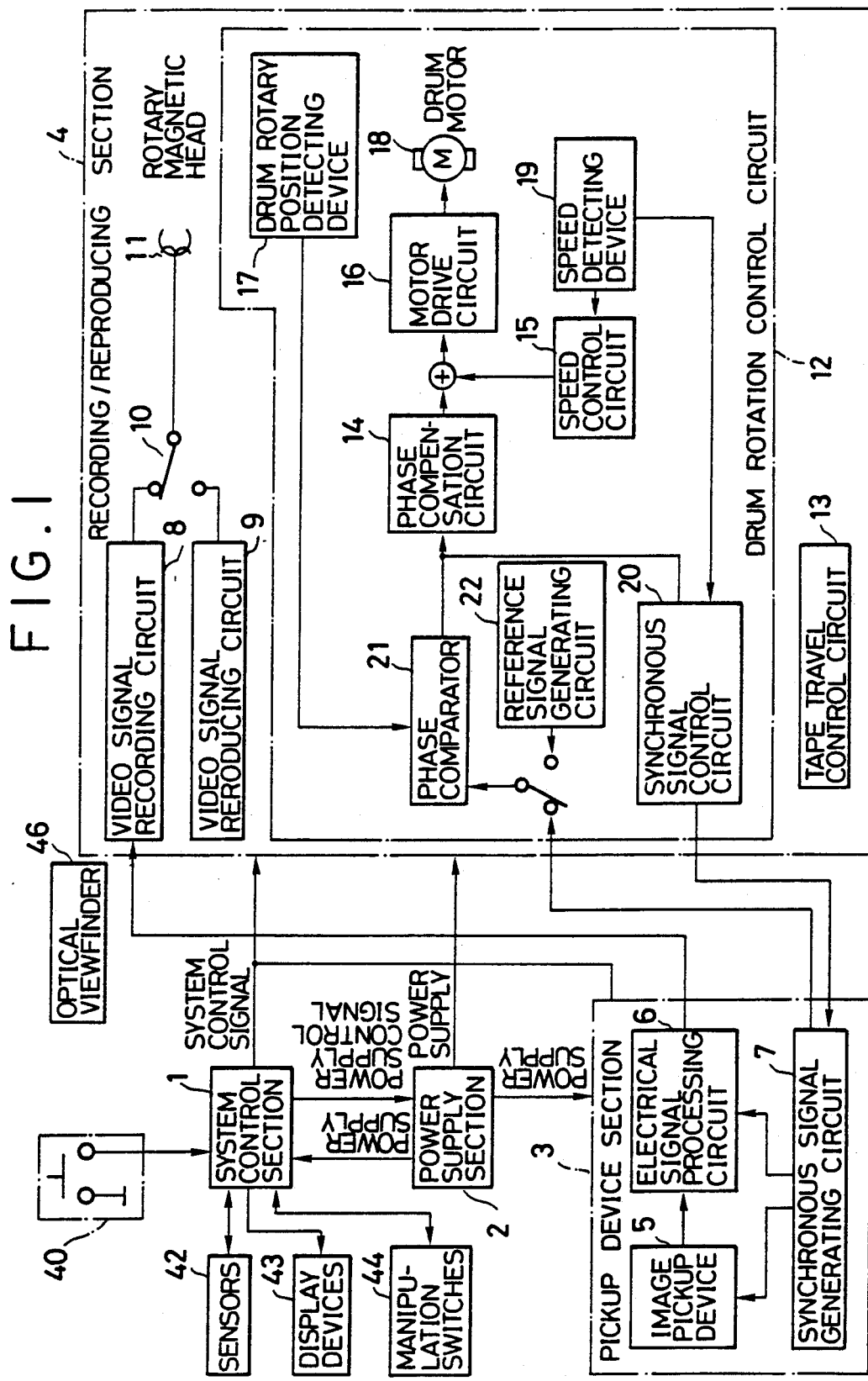
FIG. 1 is a block diagram showing the circuitry of an all-in-one camera/VTR of an embodiment of the invention.

FIG. 1 shows an all-in-one camera/VTR of an embodiment of the invention. As illustrated, it comprises an image pickup section 3. The image pickup section 3 comprises an image pickup device 5 having a lens by which an image of the subject is formed in a charge storage section of pickup element such as a CCD (charge-coupled device), a synchronous signal generating circuit 7 for generating various synchronous signals including the vertical synchronous signal. The image in the pickup element is scanned in accordance with the signal from the synchronous signal generating circuit 7 to be converted into an electrical signal, which is then converted, at an electrical signal processing circuit 6, into an ordinary television signal.

The all-in-one camera/VTR further comprises a recording/reproducing section 4 recording, by means of a rotary magnetic head, the output signal of the image pickup section 3 along tracks inclined with respect to the direction of the length of a magnetic tape. The recording/reproducing section 4 comprises a video signal recording circuit 8, a video signal reproducing circuit 9, a drum rotation control circuit 12, a tape travel control circuit 13 and the like.

The drum rotation control circuit 12 comprises a phase comparator 21, a phase compensation circuit 14, a speed control circuit 15, a motor drive circuit 16 and a drum rotary position detecting device 17 for detecting the rotary position of the rotary drum, a drum motor 18, a speed detecting device 19 and a reference signal generating circuit 22.

The recording/reproducing section 4 of the embodiment further comprises a synchronous signal control circuit 20. The synchronous signal control circuit 20 receives the rotary position detection signal from the drum rotary position detecting device 17 and the speed discrimination signal from the speed detecting device 19, and controls, in accordance with these signals, the synchronous signal generating circuit 7 of the image pickup section 3. The synchronous signal control circuit 20 may for example comprise a D-type flip-flup circuit 30 and an exclusive-OR circuit.

The all-in-one camera/VTR further comprises a system control section 1 which is a circuit block performing control over operations of the entire system. The system control section 1 receives information from a start/stop switch 40, and various other manipulation switches 44 and various sensors 42, and produces various power control signals and various system control signals, thereby to bring the system into the desired operating state and to cause various display (indication) operations of the various display devices 43. The system control section 1 also controls the power supply section 2 so that power supply to various circuits (except the system control section 1) is terminated when a recording stop signal is inputted by manipulation of the start/stop switch 40. The power supply section 2 selectively begins and stops providing power supply to the image pickup section 3 and the recording/reproducing section 4 in accordance with the power control signals from the power supply section 2. There is further provided an optical viewfinder 46 formed of a combination of several optical lenses.

Figure 3:
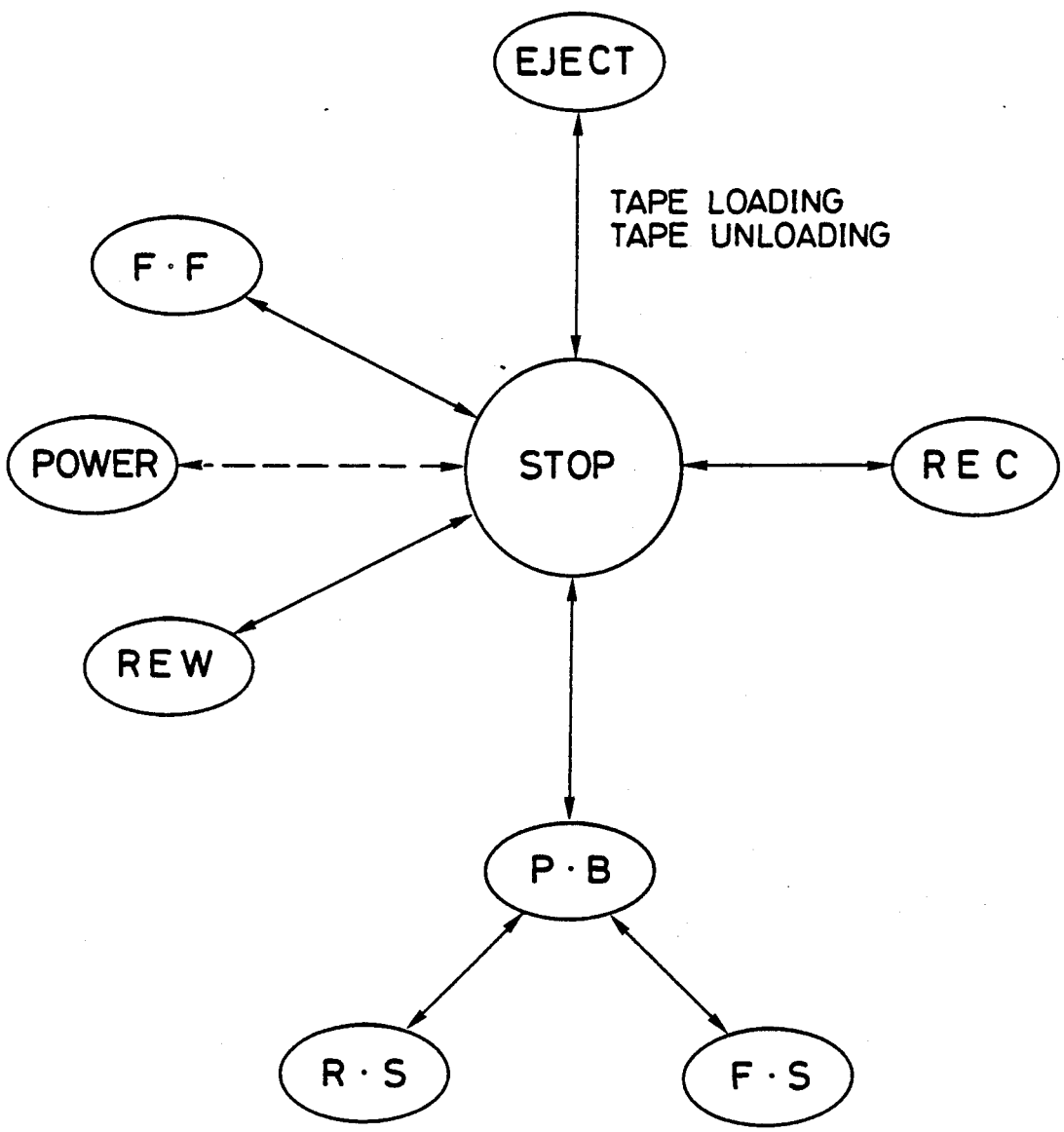
FIG. 3 is a diagram showing transitions between various system operating states of the apparatus of FIG. 1.
Figure 9:
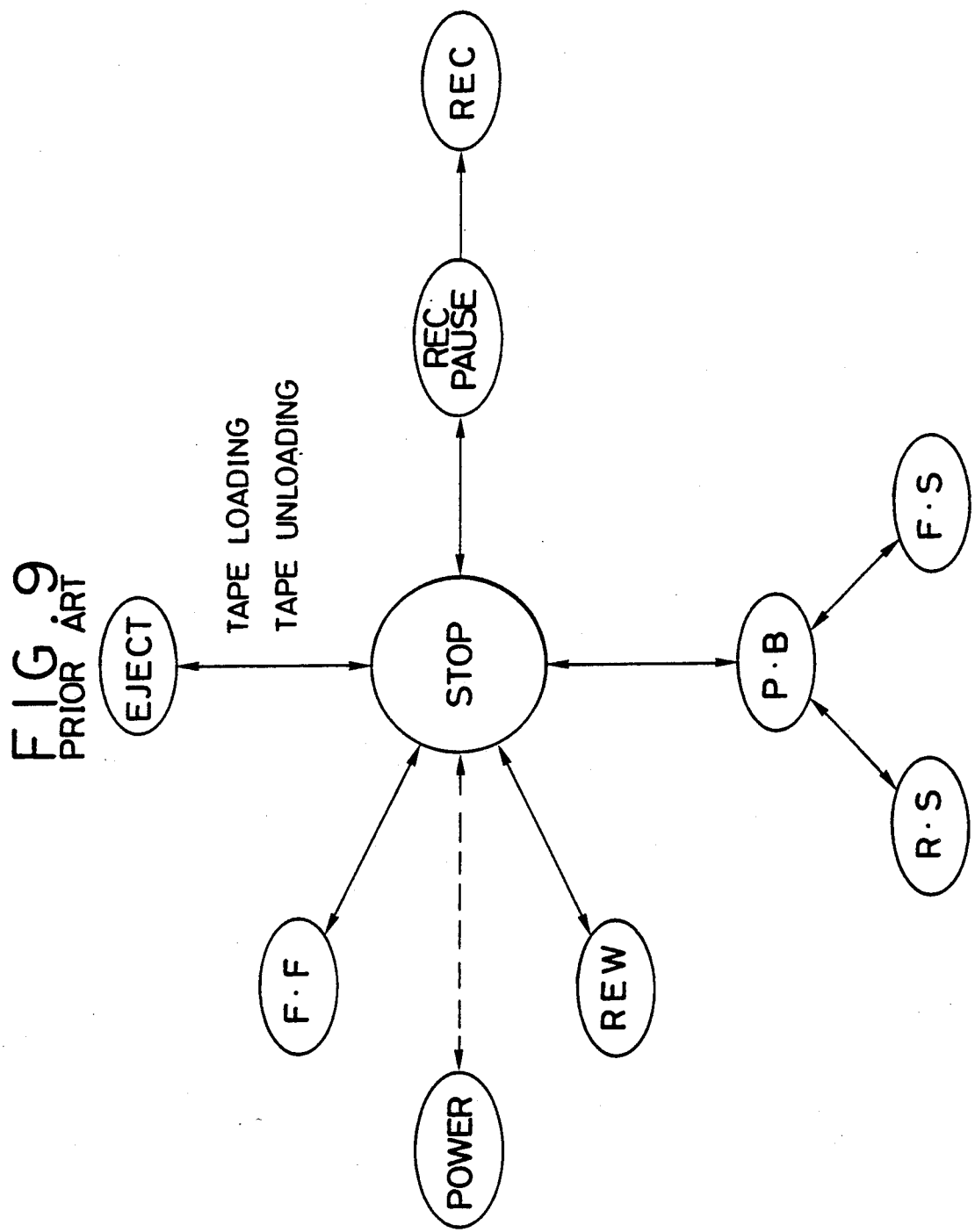
FIG. 9 is a diagram showing transitions between various system operating states of a conventional all-in-one camera/VTR.
Figure 10:
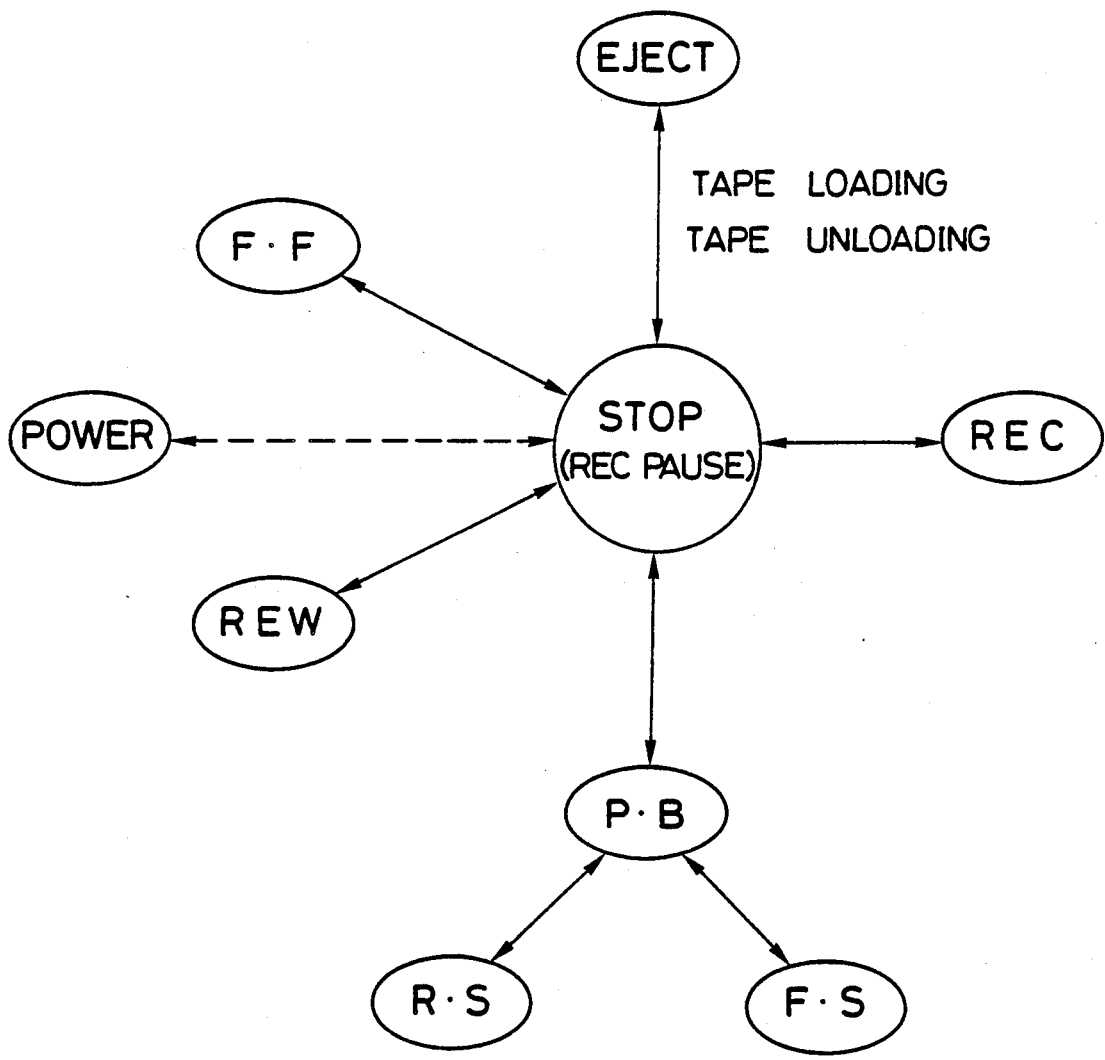
FIG. 10 is a diagram showing transitions between various system operating states of another conventional all-in-one camera/VTR.

FIG. 3 shows transitions between various system operating states of the all-in-one camera/VTR of the embodiment. It is identical to that shown in FIG. 9 except that the REC PAUSE state is not provided.

When a "shooting" is to be made, the image of the subject to be shot is confirmed on the optical viewfinder 46, and the start/stop switch 40 is manipulated. When the start/stop switch 40 is manipulated, the system operating state is transferred from STOP to REC, and supply of the electric power to the image pickup section 3 and the recording/reproducing section 4 is started.

When the supply of the electric power to the image pickup section 3 and the recording/reproducing section 4 is started the drum motor 18 is started by the drum rotation control circuit 12, and the drum rotation is brought into the constant speed state within about 0.3 to 0.5 second. A frequency generator integrated with the drum produces pulses whose frequency varies with the drum rotational speed. The speed detecting device 19 transmits the pulses to the speed control circuit 15. It also judges whether or not the drum rotation has reached a certain speed, and produces a speed discrimination signal which is at a "L" level when the certain speed is not reached and at an "H" level when the certain speed has been reached. This speed discrimination signal is fed to the synchronous signal control circuit 20. The synchronous signal control circuit 20 is formed of the D-type flip-flop circuit 30 and the exclusive-OR circuit, as was described above. In addition to the speed discrimination signal, the drum rotary position detection signal indicating the rotational phase of the drum is supplied from the drum rotary position detecting device 17 to the synchronous signal control circuit 20.

Figure 2:
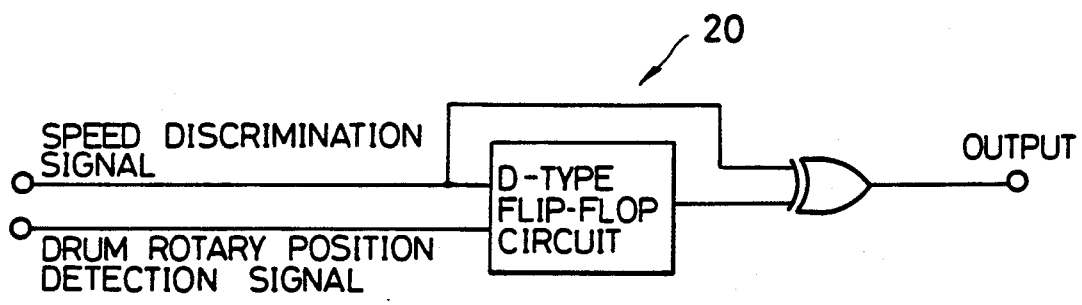
FIG. 2 is a diagram showing an example of a synchronous signal control circuit used in the apparatus of FIG. 1.
Figure 4:
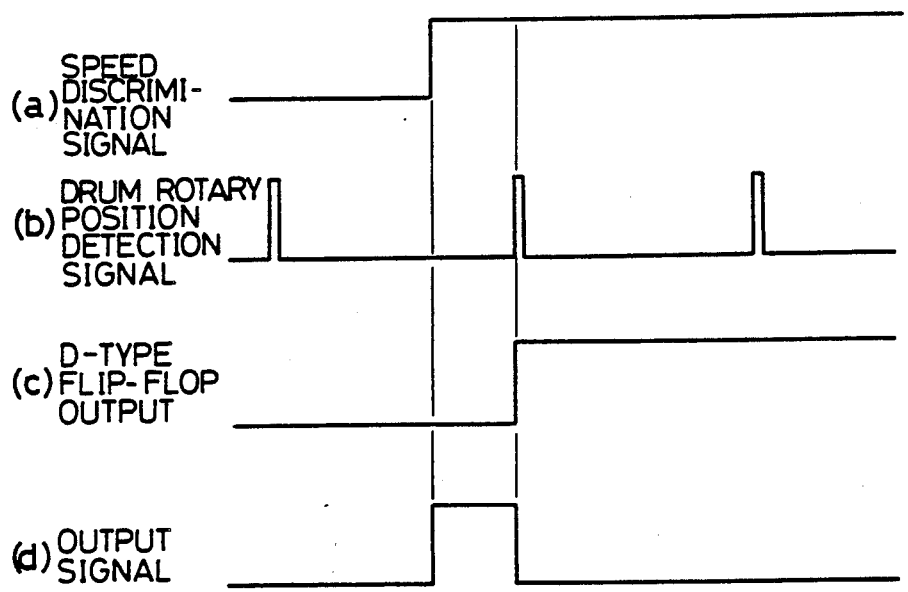
FIG. 4 is a waveform diagram showing signals at various parts of the synchronous signal control circuit shown in FIG. 2.

FIG. 4 is a timing chart showing various signals which appear in the synchronous signal control circuit 20 shown in FIG. 2. Specifically, it shows the speed discrimination signal at (a), the drum rotary position detection signal at (b), the output signal of the D-type flip-flup circuit 30 at (c), and the output signal of the synchronous signal control circuit 20 at (d). A head switching pulse, not shown, is produced in synchronism with the drum rotary position detection signal.

The output signal of the synchronous signal control circuit 20 is supplied to the synchronous signal generating circuit 7 of the image pickup section 3. The synchronous signal generating circuit 7 is mainly formed of a counter and logic circuits and produces various timing signals such as a vertical synchronous signal and a horizontal synchronous signal, which are necessary for signal processing, in accordance with a stable clock of a high frequency.

Figure 5:
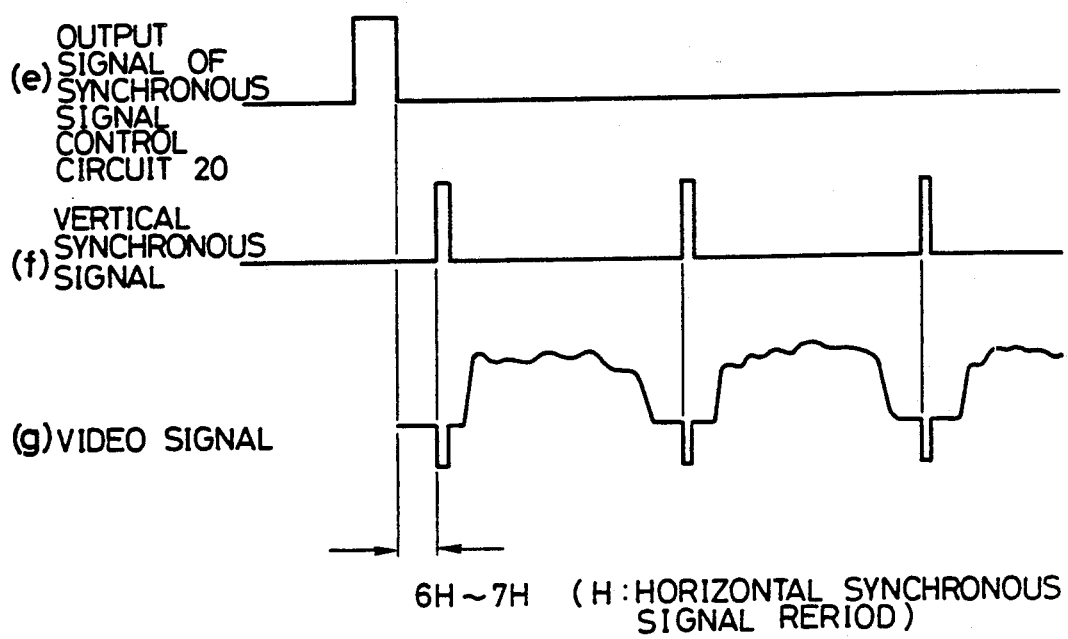
FIG. 5 is a waveform diagram showing the output signal from the synchronous signal control circuit, the vertical synchronous signal outputted from the synchronous signal generating circuit and the video signal outputted from the image pickup section, and particularly the synchronism relation between the signals.

FIG. 5 is a timing chart showing the output signal at (e) of the synchronous signal control circuit 20, the vertical synchronous signal as outputted from the synchronous signal generating circuit 7, and a video signal (at (g)) from the electrical signal processing circuit 6, which is obtained by scanning the image of the subject stored in the charge storage section of the image pickup device 5, in accordance with a timing signal from the synchronous signal generating circuit 7, and processing the signal from the image pickup device 5 at the electrical signal processing circuit 6.

The generation of the timing signal such as the vertical synchronous signal from the synchronous signal generating circuit 7 is controlled in synchronism with the output signal of the synchronous signal control circuit 20, for example, in a manner as illustrated. Specifically, the generation of the vertical synchronous signal is delayed with respect to the falling edge of the output of the synchronous signal control circuit 20 by a period corresponding to the starting point of the track and the position at which the vertical synchronous signal is to be recorded. Such a period is standardized, and is assumed to be 6H–7H in the illustrated example. Through such control of the timing signals, a video signal which is in synchronism with the rotational phase of the drum can be instantly obtained. Upon expiration of the time required for bringing the locus of the magnetic head into conformity of the locus of the previous tracks, i.e., 1 to 2 seconds after the manipulation of the start/stop switch 40, the actual recording of the signal on the magnetic tape can be started.

The charge storage section used in the image pickup device 5, may be in the form of a pickup tube or a semiconductor pickup element of MOS or CCD type, or the like. The tubes must be heated by a heater, so that a heating time of about 4 to 5 seconds is needed after the power on. It has been found that with a semiconductor pickup element, a normal video signal can be obtained within about 0.5 second, which includes the time required for the stabilization of the electrical signal processing circuit 6. Use of a semiconductor pickup element is therefore advantageous.

Use of an optical viewfinder is advantageous since it is formed of optical lenses and does not require a power supply.

Figure 6:
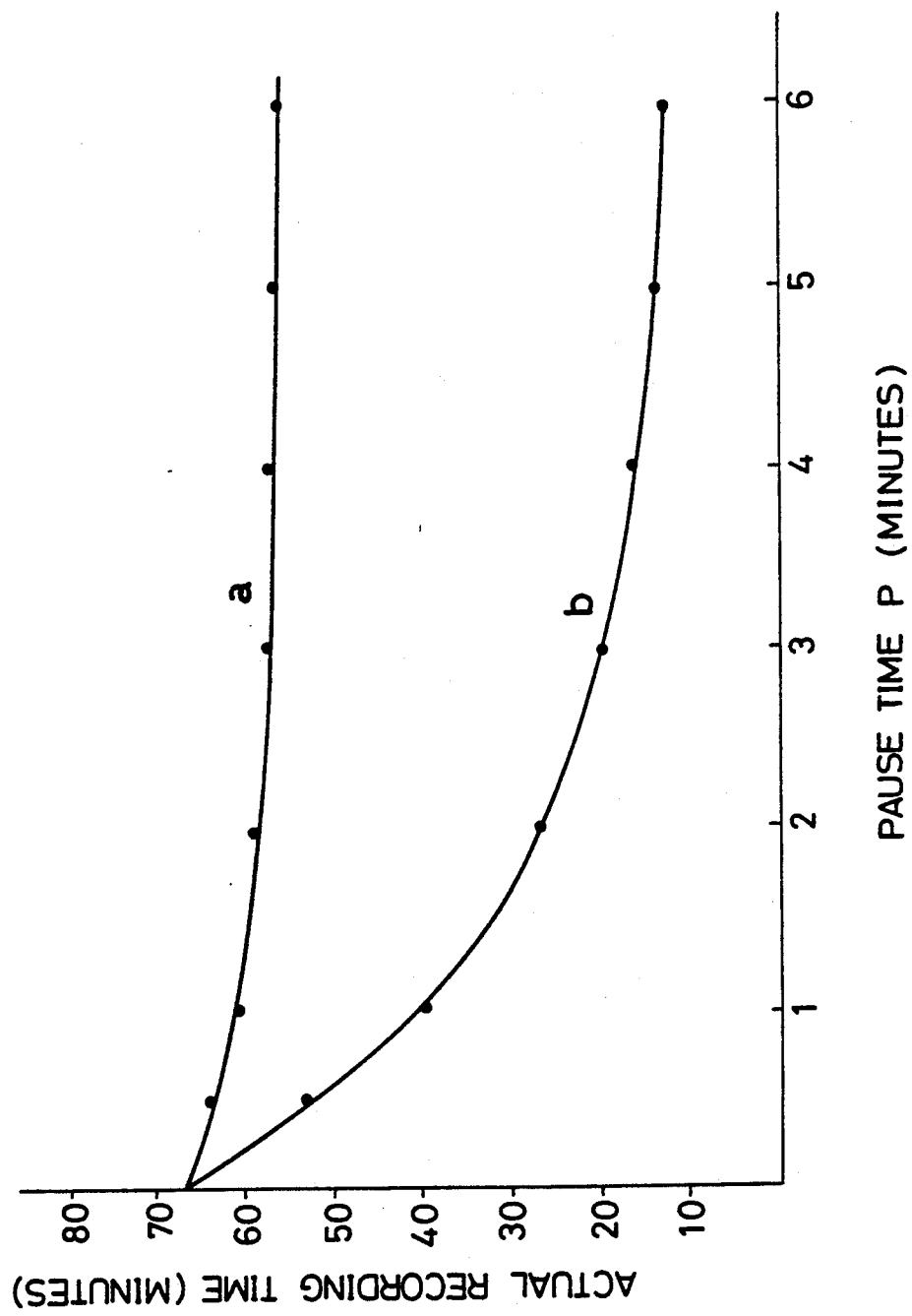
FIG. 6 is a diagram showing the actual recording time which can be achieved when the recording for 1 minutes and pause for P minutes are alternately repeated, using the battery of the same capacity, with the apparatus of the embodiment and a conventional apparatus.

FIG. 6 shows the calculated times for which actual recording can be made on the tape when recording state (REC) for 1 minutes and the pause state of P minutes are alternately repeated, using battery with a guaranteed capacity for continuous recording time of 1 hour. The actual recording time of the all-in-one camera/VTR of the present invention is shown by the curve a. As shown, the power consumption of in the pause state (STOP) is about 3% of the power consumption during the recording state. The actual recording time of a conventional all-in-one camera/VTR is shown by the curve b. The power consumption during the pause state (REC PAUSE) is about 94% of the power consumption during recording (REC). With the conventional all-in-one camera/VTR, it is so arranged that when the pause state lasts about 3 to 5 minutes, the system is automatically transferred to the standby mode (power saving mode) to reduce actual power consumption. If P=3 in FIG. 6, i.e., if the time for the pause state is set to be 3 minutes, the actual recording time is about 20 minutes with the conventional all-in-one camera/VTR, while it is about 57 minutes with the all-in-one camera/VTR of the present embodiment. Thus, it is seen that the arrangement of the invention is advantageous.

The conventional all-in-one camera/VTR described earlier is provided with a standby switch for power saving, so that the actual recording time can be extended by use of the standby switch. But this makes the manipulation complicated because the standby switch may have to be manipulated frequently. According to the apparatus of the present embodiment, it is not necessary to provide a standby switch nor to manipulate it.

Figure 7:
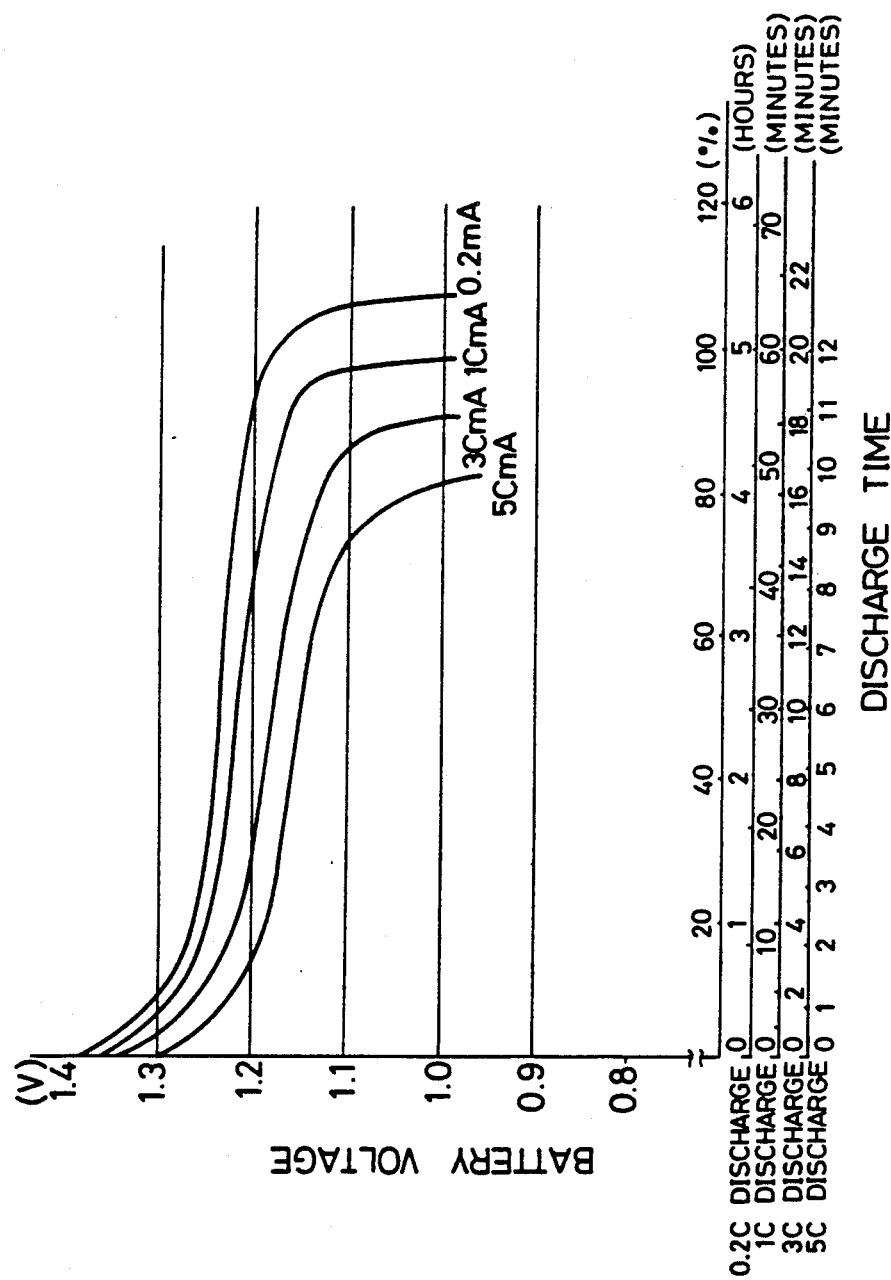
FIG. 7 is a diagram showing the discharge characteristic of a NiCd battery used in a conventional all-in-one camera/VTR.
Figure 8:
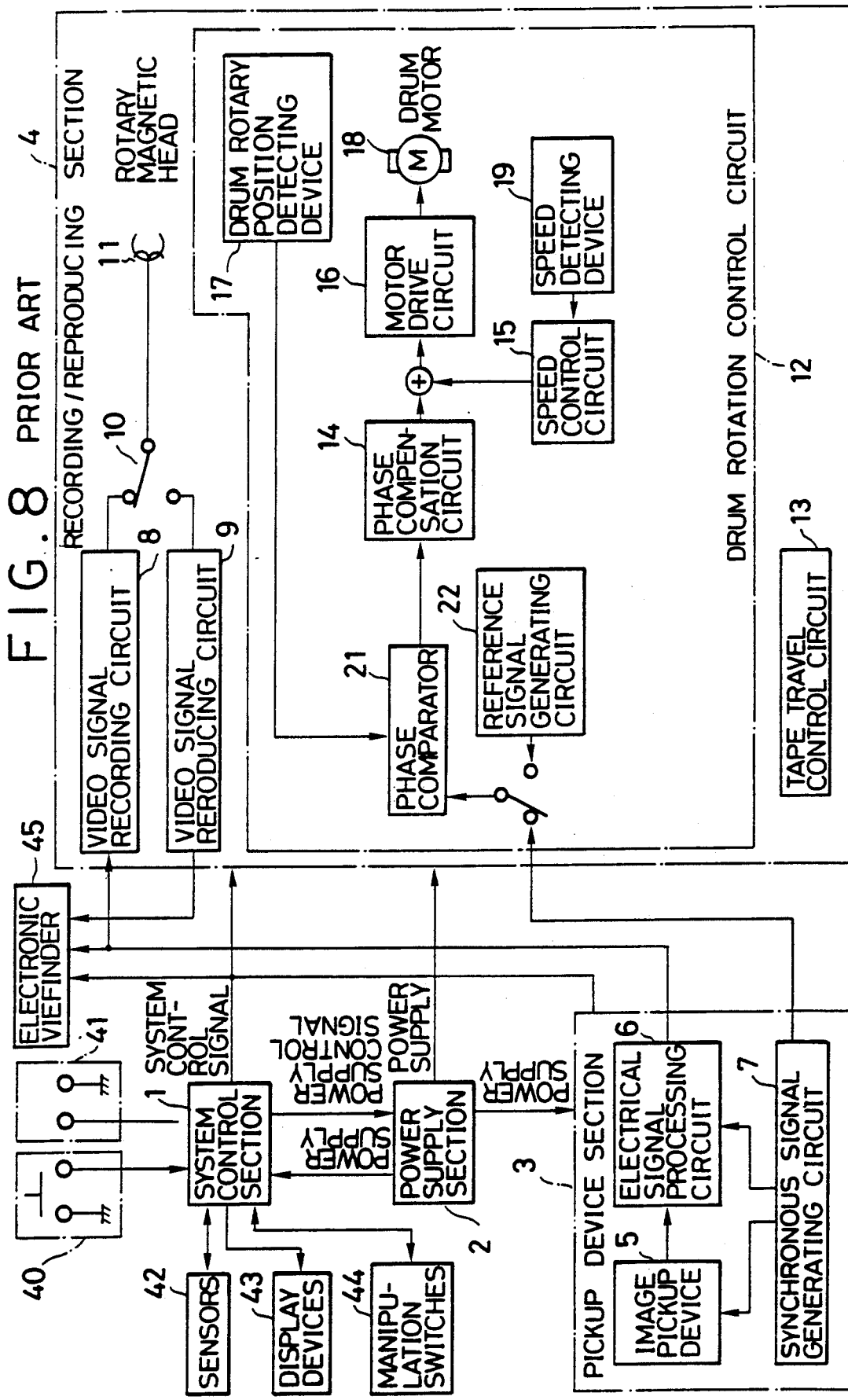
FIG. 8 is a diagram showing the circuitry of a conventional all-in-one camera/VTR.

FIG. 7 shows a discharge characteristic of a NiCd battery widely used in a conventional all-in-one camera/VTR. 1 C discharge signifies that the battery can be used for about one hour if it is continuously discharged with a consumption current of 1 CmA. As is seen from FIG. 7, with a smaller discharge amount, the continuous discharge time is substantially extended.

With the conventional all-in-one camera/VTR, the system control section 1 generally comprises a microprocessor or a microcomputer. The microcomputer is operating dynamically in accordance with a built-in clock. In this case, the microcomputer itself requires a power consumption of a few mA. But some types of the microcomputers can be set at a static operating state (so-called "sleeping mode"). In such a case, the power consumption can be reduced to about a few times of microA. If this sleeping mode is employed, the apparatus of the present embodiment exhibits a greater advantage.

As has been described according to the apparatus of the present embodiment, the power is not supplied except to the system control section in the STOP state. The consumption current is much reduced and hence the actual recording time is much extended. Moreover, it is not necessary to provide a standby switch so that the complication of the manipulation can be avoided. Moreover, the scanning of the image stored in the image pickup device is started in synchronism with the rotary phase of the rotary magnetic head, so that the recording can be promptly started when the system is switched from the "STOP" state to the REC state.

In the embodiment described, the synchronous signal generating circuit is controlled upon judgement that the rotary speed of the drum has reached a fixed speed. But as the time the drum motor reaches a fixed speed can be predicted from the characteristics of the control loop of the drum rotation control circuit, a timer setting a prefixed time from the termination of the power saving state may be used in place of the device for detecting the fixed speed being reached.

The invention is applicable not only to all-in-one camera/VRT, but also to video recording apparatus in which a camera and a VTR are separated.

What is claimed is:

1. A video recording apparatus comprising:
   a) an image pickup device section for forming an image of a subject and outputting an electrical signal corresponding to the image, the image pickup device section including
      1) an image pickup device for forming an image of a subject,
      2) a synchronous signal generating circuit for generating a predetermined synchronous signal, and
      3) a converting circuit for converting the image of the subject formed by the image pickup device into an electrical signal in accordance with the synchronous signal,
   b) a magnetic recorder for recording the electrical signal output from the image pickup device along tracks inclined with respect to the direction of the length of a magnetic tape, wherein the magnetic recorder comprises
      1) a rotary drum with a magnetic head mounted thereon,
      2) a drum motor for driving the rotary drum, and
      3) a drum rotation control circuit for controlling the rotation of the drum, wherein the drum rotation control circuit comprises:
         i) a rotary position detecting device for detecting the rotary position of the rotary drum and producing a rotary position detection signal representing the rotary position of the drum, and
         ii) a synchronous signal control circuit responsive to said rotary position detection signal from the rotary position detecting device for supplying a synchronism control signal to said synchronous signal generating circuit, thereby for controlling the image pickup device for causing commencement of the scanning of the image of the subject stored in the image pickup device in synchronism with the rotational phase of the rotary drum,
   c) a start switch manipulated to start recording by the recorder,
   d) a power supply circuit,
   e) means responsive to the manipulation of the start switch for initiating substantially simultaneous supply of power from the power supply circuit to the image pickup device section and to the recorder, wherein direct transfer from a STOP state to a REC state is effected, and
   f) a speed detecting device for detecting the rotary speed of the drum and producing a speed discrimination signal when the drum speed has reached a predetermined level, wherein said synchronous signal control circuit is also responsive to said speed discriminatior signal for producing said synchronism control signal,
   wherein the synchronous signal control circuit comprises:
      a temporary storage element receiving and storing said speed discrimination signal, and said rotary position detection signal, and
      a logic element receiving the output signal from the temporary storage element and the speed discrimination signal and producing said synchronism control signal.

2. An apparatus according to claim 1, wherein the image pickup device is formed of a semiconductor image pickup element.

3. An apparatus according to claim 2, wherein the semiconductor image pickup device has a charge storage section in which an image of the subject is formed, and is provided with means for scanning the image in accordance with a synchronous signal from the synchronous signal generating circuit to produce a continuous signal.

4. An apparatus according to claim 1, wherein the converting circuit converts the electrical signal output from the image pickup device into a television signal in accordance with said synchronous signal from the synchronous signal generating circuit.

5. An apparatus according to claim 1, wherein the temporary storage element comprises a D-type flip-flop circuit.

6. An apparatus according to claim 1, wherein the logic element comprises an exclusive-OR circuit.

7. An apparatus according to claim 1, wherein the power supply circuit supplies the image pickup device and the recorder with an electric power so that the system is transferred from the top state directly to the recording state when the start switch is manipulated.

8. An apparatus according to claim 7, wherein the power supply circuit comprises a battery.

9. A video recording apparatus comprising:
   a) an image pickup device section for forming an image of a subject and outputting an electrical signal corresponding to the image,
   b) a magnetic recorder for recording the electrical signal output from the image pickup device along tracks inclined with respect to the direction of the length of a magnetic tape, wherein the magnetic recorder comprises
      1) a rotary drum with a magnetic head mounted thereon,
      2) a drum motor for driving the rotary drum, and
      3) a drum rotation control circuit for controlling the rotation of the drum, wherein the drum rotation control circuit comprises:
         i) a rotary position detecting device for detecting the rotary position of the rotary drum, and
         ii) a synchronous signal control circuit responsive to a rotary position detection signal from the rotary position detecting device for controlling the image pickup device and causing commencement of the scanning of the image of the subject stored in the image pickup device in synchronism with the rotational phase of the rotary drum, wherein the synchronous signal control circuit comprises:
            a. a temporary storage element receiving and storing a speed discrimination signal discriminating the speed of the rotary drum, and a rotary position detection signal from the rotary position detecting device, and b. a logic element receiving the output signal from the temporary storage element and the speed discrimination signal producing a synchronism control signal, c) a start switch manipulated to start recording by the recorder, d) a power supply circuit, and e) means responsive to the manipulation of the start switch for causing power to be supplied from the power supply circuit to the image pickup device section and the recorder.

10. an apparatus according to claim 9, wherein the temporary storage element comprises a D-type flip-flop circuit.

11. an apparatrus according to claim 9, wherein the logic element comprises an exclusive-OR circuit.

12. An apparatus according to claim 9, wherein the image pickup device is formed of a semiconductor image pickup element.

13. An apparatus according to claim 12, wherein the semiconductor image pickup element has a charge storage section in which an image of the subject is formed;

14. An apparatus according to claim 9, wherein the power supply circuit supplies the image pickup device and the recorder with an electric power so that the system is transferred from the stop state directly to the recording state when the start switch is manipulated.

15. An apparatus according to claim 14, wherein the power supply circuit comprises a battery.

16. A video recording apparatus comprising:

an image pickup device for forming an image of a subject, a synchronous signal generating circuit for generating a synchronous signal, a converting circuit for converting the image of the subject picked up by the image pickup device into an electrical signal in accordance with the synchronous signal from the synchronous signal generating circuit, a rotary magnetic head for recording the output signal of the converting circuit along tracks inclined with respect to the direction of the length of a magnetic tape.

a rotary drum on which the rotary magnetic head is mounted, a rotary position detecting device for detecting the rotary position of the rotary drum, and a synchronous signal control circuit responsive to a rotary position detection signal from the rotary position detecting device for controlling the synchronous signal generating circuit and causing commencement of scanning of the image formed in the image pickup device in sychronism with the rotation of the rotary drum, wherein the synchronous signal control circuit comprises a logic circuit receiving a speed discrimination signal and the rotary position detection signal and producing a synchronism control signal to the synchronous signal generating circuit, wherein the logic circuit comprises a flip-flop circuit receiving the speed discrimination signal and the rotary position detecting signal, and an exclusive-OR circuit receiving the output of the flip-flop circuit and the speed discrimination signal.

17. An apparatus according to claim 16, further comprising a speed detector detecting the rotary speed of the rotary drum and producing the speed discrimination signal indicating that the rotary speed has reached a predetermined value.

18. An apparatus according to claim 16, further comprising means for producing the speed discrimination signal upon expiration of a predetermined time after the start of the rotation of the rotary drum.

19. A video recording apparatus comprising:

an image pickup device for forming an image of a subject, a synchronous signal generating circuit for generating a synchronous signal, a converting circuit for converting the image of the subject picked up by the image pickup device into an electrical signal in accordance with the synchronous signal from the synchronous signal generating circuit, a rotary magnetic head for recording the output signal of the converting circuit along tracks inclined with respect to the direction of the length of a magnetic tape, a rotary drum on which the rotary magnetic head is mounted, a rotary position detecting device for detecting the rotary position of the rotary drum and producing a rotary position detecting signal representing the rotary position of the drum, a synchronous signal control circuit responsive to said rotary position detection signal from the rotary position detecting device for supplying a synchronism control signal to the synchronous signal generating circuit for controlling the synchronous signal generating circuit and causing commencement of scanning of the image formed in the image pickup device in synchronism with the rotation of the rotary drum thereby to synchronize the scanning of the subject stored in the image pickup device with the rotational phase of the rotary drum, and a speed detector detecting the rotary speed of the rotary drum and producing a speed discrimination siganl indicating that the rotary speed has reached a predetermined value, wherein said synchronous signal control circuit is also responsive to said speed discrimination signal for producing said synchronism control signal, wherein the synchronous signal control circuit comprises a logic circuit receiving the speed discrimination signal and the rotary position detection signal and producing said synchronism control signal to the synchronous signal generating circuit, and wherein the logic circuit comprises a flip-flop circuit receiving the speed discrimination signal and the rotary position detecting signal, and an exclusive-OR circuit receiving the output of the flip-flop circuit and the speed discrimination signal.

20. A video recording apparatus comprising:

an image oickup device for forming an image of a subject, a synchronous signal generating circuit for generating a synchronous signal, a converting circuit for converting the image of the subject picked up by the image pickup device into an electrical signal in accordance with the synchronous signal from the synchronous signal generating circuit, a rotary magnetic head for recording the output signal of the converting circuit along tracks inclined with respect to the direction of the length of a magnetic tape, a rotary drum on which the rotary magnetic head is mounted, a rotary position detecting device for detecting the rotary position of the rotary drum and producing a rotary position detecting signal representing the rotary position of the drum, a synchronous signal control circuit responsive to said rotary position detection signal from the rotary position detecting device for supplying a synchronism control signal to the synchronous signal generating circuit for controlling the synchronous signal generating circuit and causing commencement of scanning of the image formed in the image pickup device in synchronism with the rotation of the rotary drum thereby to synchronize the scanning of the subject stored in the image pickup device with the rotational phase of the rotary drum, a speed detector detecting the rotary speed of the rotary drum and producing a speed discrimination signal indicating that the rotary speed has reached a predetermined value, wherein said synchronous signal control circuit is also responsive to said speed discrimination signal for producing said synchronism control, and means for producing a speed discrimination signal upon expiration of a predetermined time after the start of the rotation of the rotary drum, wherein said synchronous signal control circuit is also responsive to said speed discrimination signal for producing said synchronism control signal, wherein the synchronous signal control circuit comprises a logic circuit receiving the speed discrimination signal and the rotary position detection signal and producing said synchronism control signal to the synchronous signal generating circuit.

* * * * *